United States Patent [19]
Wollermann

[11] Patent Number: 5,522,130
[45] Date of Patent: Jun. 4, 1996

[54] LASER POSITIONING SYSTEM FOR WIRE CUTTING AND STRIPPING APPARATUS

[75] Inventor: Kenneth A. Wollermann, Waterford, Wis.

[73] Assignee: Artos Engineering Company, Waukesha, Wis.

[21] Appl. No.: 322,215

[22] Filed: Oct. 13, 1994

[51] Int. Cl.⁶ .............................. H01R 43/00; B23P 23/00
[52] U.S. Cl. .............................. 29/825; 29/33 F; 81/9.51
[58] Field of Search .............................. 81/9.51; 29/825, 29/828, 33 F

[56] References Cited

U.S. PATENT DOCUMENTS

| | | |
|---|---|---|
| 5,060,395 | 10/1991 | Pepin . |
| 5,067,379 | 11/1991 | Butter et al. ........................ 81/9.51 X |
| 5,140,873 | 8/1992 | Schwartzman ...................... 81/9.51 X |
| 5,146,673 | 9/1992 | Hoffa ..................................... 29/828 |
| 5,235,735 | 8/1993 | Koch .................................. 81/9.51 X |
| 5,253,555 | 10/1993 | Hoffa ..................................... 81/9.51 |
| 5,265,502 | 11/1993 | Hoffa ..................................... 81/9.51 |
| 5,272,941 | 12/1993 | English et al. .......................... 81/9.51 |
| 5,293,683 | 3/1994 | Hoffa .................................. 81/9.51 X |
| 5,317,812 | 6/1994 | McMillin et al. . |
| 5,343,605 | 9/1994 | Nazerian et al. ................... 81/9.51 X |
| 5,375,485 | 12/1994 | Hoffa ..................................... 81/9.51 |
| 5,402,693 | 4/1995 | Hoffa ..................................... 81/9.51 |

*Primary Examiner*—Carl J. Arbes
*Attorney, Agent, or Firm*—Andrus, Sceales, Starke & Sawall

[57] ABSTRACT

A laser positioning system for a wire cutting and stripping apparatus. Insulated wire having an outer layer of frayable insulation is fed in a downstream path in increments of length by a feeding and measuring unit. A wire burning unit is located upstream of the feeding and measuring unit and includes two pair of cooperating heated dies, which serve to burn a pair of short lengths of the insulation and provides spaced areas of exposed bare wire. A cutting and stripping unit is located downstream of the burning unit and includes a pair of cooperating cutting blades and two pair of cooperating stripping blades which are located on either side of the cutting blades. A laser sensing unit is disposed adjacent the cutting and stripping unit, and generates a laser beam curtain that senses a change in diameter of the wire. When an exposed wire area intersects the laser curtain, an electrical signal is generated and the signal is fed to a controller which commands the feeding mechanism to move the wire axially to precisely position the exposed wire areas in precise registry with the cutting and stripping unit.

19 Claims, 1 Drawing Sheet

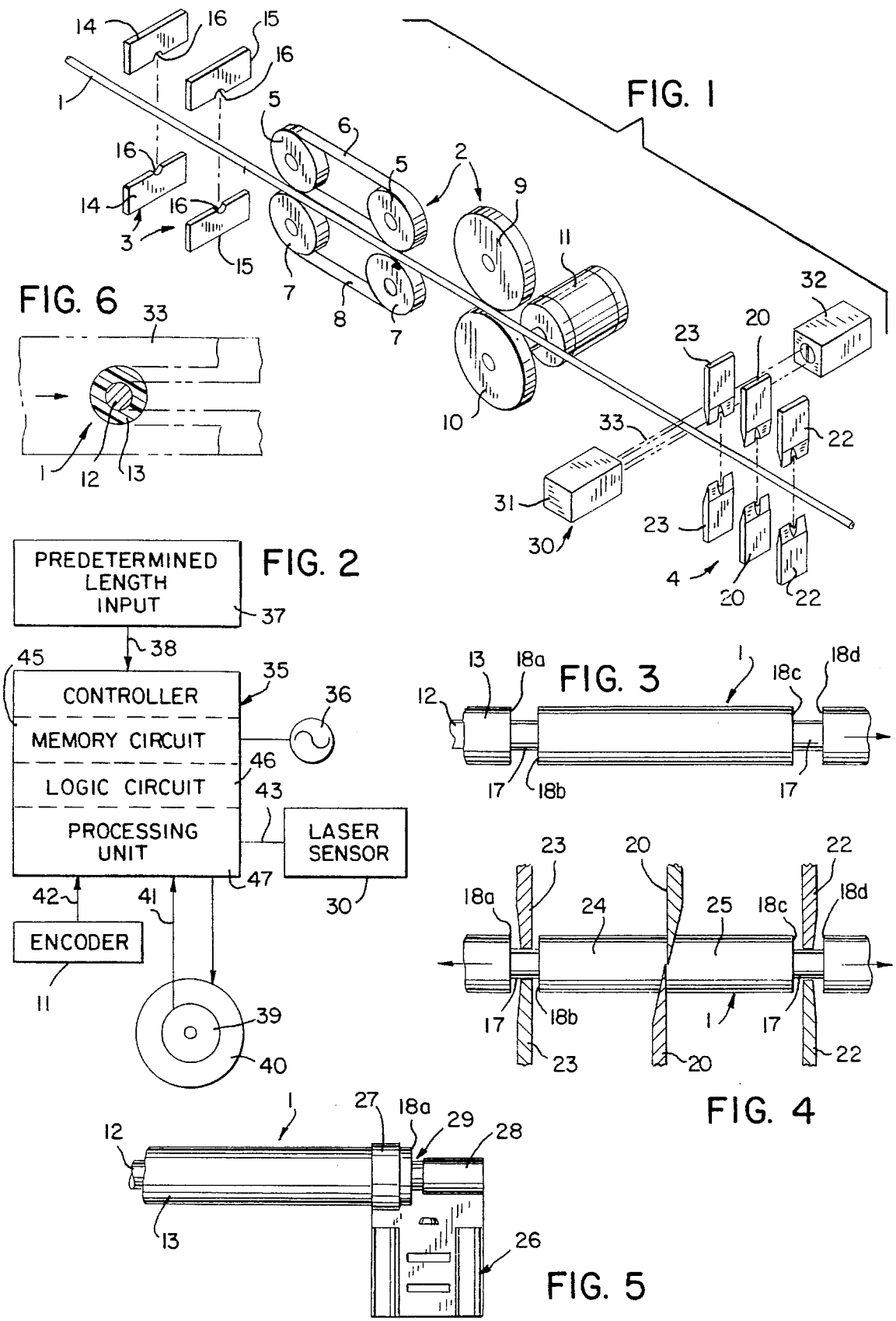

LASER POSITIONING SYSTEM FOR WIRE CUTTING AND STRIPPING APPARATUS

BACKGROUND OF THE INVENTION

Electrical harnesses are produced by cutting insulated wire to the desired length, stripping insulation from the cut ends and then applying terminals to one or both of the cut ends. In the typical wire cutting and stripping process, wire contained on a supply coil is fed in predetermined increments of length by cooperating feed rolls or belts to a cutting and stripping station. The cutting and stripping station includes a pair of central cooperating cutting blades and two pair of cooperating stripping blades which are located in spaced relation on either side of the cutting blades. After the predetermined length of wire has been fed through the cutting and stripping station, the cutting and stripping blades are moved toward each other, causing the cutting blades to sever the wire and simultaneously causing the stripping blades to cut the insulation.

Wire gripping units, located both upstream and downstream from the cutting and stripping station, grip the wire as well as the cut length of wire, and move the wire and cut length in opposite directions, thereby stripping slugs of insulation from the ends of the wire and from the cut length.

In a typical wire feeding and measuring apparatus as described in U. S. Pat. No. 5,060,395, the wire is fed by a pair of cooperating endless feed belts, which engage opposite sides of the wire. The feed belts are intermittently driven by a servo motor which is programmed to drive the feed belts forwardly and feed a predetermined length of wire and then stop movement of the wire. As described in the above patent, a drive wheel is located downstream of the feed belts and a measuring wheel is located opposite the drive wheel. The measuring wheel rides against the wire and measures the actual distance the wire has moved and provides a feed-back signal through an encoder to a controller. In the event wire slippage occurred during forward feeding movement, the controller uses the feedback signal to ascertain whether less or more wire than the predetermined length has actually been fed, and commands the feed belts to feed the wire either forwardly or in reverse to correct for the discrepancy.

The wire feeding mechanism as described in the aforementioned patent is very accurate and repeatable when using a wire having a firmly bonded plastic insulation. Certain types of heat resistant insulated wire include an outer woven fabric-like covering, and it has been found that when this type of insulation is cut, the material will fray. Thus, with this type of insulated covering, the insulation is normally not cut by the stripping blades, but instead is subjected to a burning action in which cooperating heated dies engage the wire at spaced locations to burn short lengths of the insulation away from the wire, and provide two spaced areas of exposed bare wire. The burning operation will fuse the fibrous material adjacent the burned area, thereby preventing fraying.

Following the burning operation, the wire is moved in increments to the cutting and stripping station, and it is necessary to precisely align the cutting blades at the cutting and stripping station with the midpoint of the length of the insulation between the two burned areas and to align the stripping blades with the exposed bare wire areas. Due to the fact that the insulation is not bonded to the wire, but instead is loosely woven on the wire, and as several increments of movement are required in moving from the burning station to the cutting and stripping station, there is a possibility for cumulative error, such that the burned areas may not be precisely positioned with respect to the cutting and stripping units.

An electrical terminal is usually attached to the stripped end of the wire and/or to the stripped end of the cut length. The typical terminal includes an insulation crimp which is crimped about the insulation adjacent the stripped end, and a wire crimp which is crimped to the bare wire. A gap or window is located between the two crimps. In production it is important that the insulation shoulder, which borders the stripped wire end, be located within the window. If the burned areas in the insulation are not properly positioned with respect to the cutting and stripping blades, the stripped wire end may be of an improper length, which means that the shoulder on the insulation bordering the stripped end will not be aligned with the window in the terminal, making the terminal connection defective and necessitating the scrapping of the wire and connected terminal.

SUMMARY OF THE INVENTION

The invention is directed to a wire cutting and stripping apparatus for cutting and stripping frayable fabric insulation from an insulated wire or conductor, and in particular to a laser positioning system for accurately positioning the wire at the cutting and stripping station.

The wire is fed in a downstream path in increments of predetermined length by a wire feeding mechanism. Located upstream of the feeding mechanism is a wire burning unit including two pair of heated cooperating dies, which serve to burn a pair of short lengths of insulation and provide spaced areas of exposed wire.

A cutting and stripping unit is positioned downstream of the burning unit and feeding mechanism, and includes a pair of cooperating cutting blades and two pair of cooperating stripping blades. The stripping blade pairs are located on opposite sides of the cutting blades. The cutting blades are adapted to sever the insulated wire at a location intermediate the pair of bare wire areas and provide a cut wire length, while each pair of stripping blades is brought into registry with one of the base wire areas. The wire is then gripped by a wire gripping mechanism and pulled upstream, while the cut length of wire is gripped by a second wire gripping mechanism and pulled downstream, thus causing the stripping blades to strip slugs of insulation from the wire and from the cut length.

To accurately position the burned areas of the wire relative to the cutting and stripping unit, a laser sensing unit is located adjacent the cutting and stripping unit. The laser sensing unit includes a transmitter, which directs a thin laser beam curtain across the path of the insulated wire, while a receiver is located on the opposite side of the path of travel of the wire. The laser curtain is capable of depicting minute differences in the contour in the insulation wire, and preferably is employed to detect the leading shoulder of the insulation which borders the first or downstream burned exposed wire area. The change in diameter is translated into a change in light quantity and the resulting output voltage is fed, along with a signal from a measuring wheel operating through an encoder, to a controller. The controller in turn will actuate the feeding mechanism to feed the wire and accurately position the cutting blades between the two burned-off exposed areas of wire.

With the invention, the laser sensor will detect the location of the insulation shoulder bordering the burned area to more precisely position the cutting blades at the proper location intermediate the burned areas. The invention thus eliminates cumulative error which can occur when the wire is fed in short lengths of movement and results in more precisely controlled stripped lengths of wire to ensure proper attachment of terminals or seals. As the invention ensures proper attachment of terminals, it minimizes possible scrap resulting from improper terminal attachment.

The invention also eliminates operator error in set up that has occurred in the past by the operator manually positioning the burning dies a specified distance from the cutting blades in an attempt to obtain proper orientation of the cutting blades with respect to the burned areas.

Other objects and advantages will appear in the course of the following description.

DESCRIPTION OF THE DRAWINGS

The drawings illustrate the best mode presently contemplated of carrying out the invention.

In the dawings:

FIG. 1 is a schematic view showing the apparatus of the invention;

FIG. 2 is a diagrammatic showing of the electronic circuitry;

FIG. 3 an enlarged diagrammatic view showing a pair of burned areas of insulation;

FIG. 4 a view similar to FIG. 3, showing the action of the cutting and stripping blades;

FIG. 5 is a fragmentary plan view showing the attachment of a terminal to a stripped wire end; and FIG. 6 is a diagrammatic view showing the wire intersecting the laser beam curtain.

DESCRIPTION OF THE ILLUSTRATED EMBODIMENT

The invention is directed to an improved wire cutting and stripping apparatus, and more specifically to a laser positioning system to be utilized with the cutting and stripping apparatus.

As shown in FIG. 1, an insulated wire 1 is fed in predetermined increments of length in a downstream direction by a feeding and measuring unit 2. Located upstream of the feeding and measuring unit 2 is an insulation burning unit 3 which acts to burn away a pair of spaced lengths of insulation from wire 1 when the wire is momentarily stopped between increments of movement. Located downstream of the feeding unit 2 is a cutting and stripping unit 4 that functions to cut the wire between a pair of areas of burned away insulation, and strip the slug of insulation from the wire end as well as from the cut length of wire. Following the stripping of the insulation from the wire and the cut length, a terminal can be affixed to the stripped end of the wire and/or the stripped end of the cut length by a conventional terminal attachment machine.

The wire feeding and measuring unit 2 can be similar to that described in U. S. Pat. No. 5,317,812, and the construction of that patent is incorporated herein by reference. The feeding and measuring unit 2 includes a pair of upper feed rolls 5 which carry a tractor-type belt 6 that engages the upper surface of the wire. The feed unit also includes a pair of lower feed rolls 7, and a belt 8, similar to belt 6, is trained over the roll 7 and is adapted to engage the lower surface of the wire. Through operation of the belts 6 and 8, the wire 1 is driven in a downstream direction in predetermined increments of movement.

The feed and measuring unit 2 also includes a drive roll 9 which engages the upper surface of the wire and an opposed measuring wheel 10 that rides against the lower surface of the wire. Drive roll 9 is driven in synchronization with the belts 6 and 8. The drive mechanism for driving the rolls 5, 7, and 9 can be similar to that described in the aforementioned patent application.

Measuring wheel 10 is adapted to measure the actual length of the wire being fed. Measuring wheel 10 is operably connected to an encoder 11 and provides a feedback signal through the encoder to a controller. As described in the aforementioned U.S. patent, in the event wire slippage occurs during forward feeding movement, the controller employs the feedback signal to ascertain whether less or more wire than the predetermined length been actually fed, and commands the feed belts 6 and to feed the wire either forwardly or reverse to correct the discrepancy. The measuring wheel 10 then senses the direction and distance a wire moves during the correction operation and signals the controller accordingly, thereby enabling the controller to actuate the feed belts to stop wire movement when the predetermined length has been fed.

Insulated wire 1 includes an inner metal core 12 which is covered by a layer of insulation 13. Insulation 13 is generally a heat resistant type and is in the form of a fabric woven around the core wire 12. Thus the insulation is not firmly bonded to the core wire, but is loosely secured thereon. If this type of insulation is cut by a conventional stripping blade, the insulation tends to fray at the cut edge. Therefore, it has been the practice when dealing with insulation of this type, to burn the insulation through use of heated blades or dies, and the burning operation will fuse the fibers at the burnt edge, thus preventing fraying.

The insulation burning unit 3 includes two pair of cooperating blades or dies 14 and 15, and each blade is provided with a curved or arcuate recess 16. The dies are heated and when closed about the insulation, will melt or fuse the insulation, thus providing a burned area 17 in which the core wire 12 is exposed. The fibers are fused at the shoulders 18 bordering each burned area 17 so that fraying of the fibers is eliminated. The burning dies 14 and 15 are designed to provide a clean burned area 17 that is about 1.0 to 1.5 mm in length and extends 360° around the core wire 12 without any melt debris or seam ridges. The upstream exposed wire area 17 is bordered by shoulders 18a and 18b, while the downstream area 17 is bordered by shoulders 18c and 18d.

The burning dies are set such that the distance from the leading shoulder 18d of the downstream burned area 17 to the trailing shoulder 18a of the upstream burned area 17 is equal to the sum of the desired strip lengths.

The dies 14 and 15 are located a predetermined distance from the cutting and stripping unit 4, so that as the wire is advanced in increments from the burning unit 3 to the cutting and stripping unit 4, the cutting blades of the cutting and stripping unit will be precisely positioned between the burned areas 17, as will be hereinafter described.

The cutting and stripping unit 4 is a conventional type, including a pair of cooperating cutting blades 20, a pair of downstream stripping blades 22 which are located downstream of the cutting blades, and a pair of stripping blades 23 which are located upstream of the cutting blades. The upper cutting blade 20, as well as the upper stripping blades 22 and 23 can be mounted in a suitable cutting block, and similarly the lower cutting blade 20, along with the lower striping blades 22 and 23, are mounted in a lower cutting block. The cutting blocks can be moved in a direction toward and away from each other in a conventional manner, causing the cutting blades 20 to sever the insulated wire 1, while the stripping blades are adapted to be moved into registry with the burned areas 17, and are designed so they will not contact or nick the core wire 12.

After the wire 1 has been cut by the action of the cutting blades 20, the slugs of insulation 24 and 25 are removed from the end of the wire as well from the end of the cut length. In this regard, conventional wire gripping units, located both upstream and downstream from the cutting and stripping unit, grip the insulated wire 1, as well as the cut length, and move the wire and cut length in opposite directions relative to the stripping blades, thus causing the stripping blades 22 and 23 to strip slugs 24 and 25 of insulation from the ends of the wire and from the cut length, respectively.

It is important when attaching terminal or seals to the stripped wire ends of the cut length that the stripped ends be of a precise and uniform length. FIG. 5 shows the attachment of a terminal 26 to the stripped end of a cut length of wire. As shown in FIG. 4, the terminal includes an insulation crimp 27 which is crimped around the insulation 13, and a wire crimp 28 which is crimped around the stripped core wire end 12. A gap or window 29 is located between the two crimps 27 and 28, and it is important that the shoulder, such as 18, be located within the window 29. If the shoulder is positioned under the insulation crimp 27, or under the wire crimp 28, the terminal attachment will be defective and the part must be scraped. Therefore, it is important that the two burned areas 17 in the wire be accurately positioned relative to the cutting and stripping unit, so that the stripped end will have a precise and uniform length.

This result is achieved through a laser sensing unit 30, which is positioned adjacent the cutting and stripping unit. The laser sensing unit includes a transmitter 31 which is located on one side on the path of travel of wire 1, and a receiver 32, which is located on the opposite side of the path. A thin curtain-type laser beam 33 emitted from the laser diode in the transmitter 31 is converged into a parallel beam by the projecting lens unit. The laser beam is then directed through a slit in the receiver 32, and focused on a light sensing element. As the wire moves through the vertical center of the curtain-type laser beam, the change in size of the received light quantity caused by the burned area 17 intersecting the laser beam 33, as illustrated diagrammatically in FIG. 6, is translated into an analog output voltage, which is transmitted to the controller as will be hereinafter described. The laser sensor to be utilized can be a type such as a Keyence LX Series sensor.

The mechanism for controlling the operation of the cutting and stripping apparatus is shown diagrammatically in FIG. 2, and includes a programmable electronic controller 35 that is energized from a suitable electrical power source 36. A manually operable data input. device, such as a keyboard 37, provides the desired predetermined length set point data, and other data to the controller. Controller 35, receives and processes electric input signals from the input device 37 through line 38, from a tachometer 39 associated with servo motor 40 through line 41, from encoder 11 through line 42 and from the laser sensing unit 30 through line 43. With this input, controller 35 provides an output signal to operate the servo motor 40. In addition, an output signal from the controller 35 can also be employed to control a pneumatic actuator which will move the upper feed rolls 5 and drive roll 7 in a direction toward and away from the lower feed rolls 7 and measuring wheel 10. The connection of the controller to the pneumatic actuator is not shown in FIG. 2, but can be designed in a manner shown in U.S. Pat. No. 5,060,395.

Controller 35, in general, comprises memory circuitry 45, logic circuitry 46, and a central processing unit (CPU) 47 for storing and/or processing incoming data and providing appropriate output signals for operating the feed unit.

In operation, the operator uses data input device 37 to enter data into controller 35 relating to the predetermined length of wire to be fed, and the number of such lengths to be fed. The controller 35 then commands the servo motor 40 so that the feed belts 6 and 8 feed the wire 1 in a forward or downstream direction. The encoder 11 signals the controller 35 as to the length of wire fed.

During each automatic cycle, the input will feed the wire approximately 0.1 inch short of the programmed length, and enter a laser search cycle. The wire will then continue to feed forward at a slower rate until it receives an indication from the laser sensing unit that it has detected the insulation shoulder 18. If the insulation shoulder is detected within the programmed tolerance, as for example −0.1 to +0.1 inch. The controller 35 will compare the actual detected position to the theoretical position of the insulation shoulder 18 and use this data to correctly position the wire 1 in the cutter head 4, and the cycle then continues with the cutting and stripping action. If the insulation shoulder is not detected within the programmed tolerance limit, the machine will stop and display an appropriate error message.

The laser sensing unit, used in conjunction with the controller, will accurately locate the cutting blades 20 precisely intermediate the two burned areas 17 of the wire, thus positioning the stripping blades 22 and 23 within the burned areas 17 and spaced from the fused shoulders 18a–18d. This ensures that the stripped ends of the wire will have a precise and uniform length, thereby enabling terminals to be properly attached to the stripped wire ends.

The invention eliminates cumulative error which can occur when feeding small increments or lengths of wire having a woven or relatively loose insulation.

The invention also eliminates potential operator error in setting up the position of the burning blades 14 and 15 relative to the cutting and stripping blades.

Various modes of carrying out the invention are contemplated as being within the scope of the following claims particularly pointing out and distinctly claiming the subject matter which is regarded as the invention.

I claim:

1. In a wire cutting and stripping apparatus, feeding means for feeding an insulated wire in an axial downstream direction in an incremental path of movement;

insulation removing means for removing a short length of insulation from said wire and providing an exposed area of bare wire bordered by a pair of insulation shoulders;

a wire cutting and stripping unit disposed downstream of said insulation removing means and including cutting means for severing the wire and stripping means registering with said exposed area for stripping the insulation from the end of said wire as said wire is moved axially;

photoelectric sensing means located adjacent said cutting and stripping unit for directing a light beam in intersecting relation with the path of movement of said wire, said photoelectric sensing means being responsive to a change in cross section of said wire to generate an electrical signal as said exposed area intersects said beam; and a controller for receiving signals from an input device and from said photoelectric sensing means and for operating said feeding means to position said shoulder at a precise distance from said cutting means.

2. The apparatus of claim 1, wherein said photoelectric sensing means is located between the insulation removing means and said cutting and striping unit.

3. The apparatus of claim 2, wherein said photo electric sensing means is located immediately upstream of said cutting and stripping unit.

4. The apparatus of claim 1, wherein said photo electric sensing means comprises a transmitter located on one side of said path of travel for transmitting a thin vertical beam of light that intersects said path; and a receiver located on the opposite side of said path for receiving said beam.

5. The apparatus of claim 4, wherein said beam is a laser beam.

6. The apparatus of claim 1, wherein said insulation removing means comprises a pair of cooperating heated dies to burn the insulation from said area.

7. The apparatus of claim 6, wherein said dies are constructed and arranged to encompass said wire and burn the insulation through an arc of 360°.

8. The apparatus of claim 1, and including a rotatable measuring wheel disposed to ride against the wire as said wire is being fed by said feeding means, and encoder means operably connected to said measuring wheel for generating a feedback signal in accordance with rotation of said measuring wheel, said feedback signal being transmitted to said controller to operate said feeding means.

9. The apparatus of claim 1, wherein said photoelectric sensing means is constructed and arranged to sense the location of one of said shoulders.

10. In a wire cutting and stripping apparatus;

feeding means for feeding an insulated wire in a downstream direction in an incremental path of travel;

insulation removing means for removing insulation from a pair of spaced short lengths of wire to provide a pair of spaced exposed bare wire areas, each exposed bare wire area being bordered by a pair of spaced shoulders of said insulation;

a cutting and stripping unit disposed down stream of said insulation removing means and including a pair of central cutting blades and two pair of stripping blades, each located on opposite sides of said cutting blades;

a laser beam sensing unit located adjacent said cutting and stripping unit for generating a thin curtain of light that intersects said path of travel, said sensing unit being responsive to a change in cross sectional area of wire to generate an electric signal; and a controller for receiving signals from an input device and from said laser sensing unit for operating said feeding means to precisely position said bare wire areas relative to said cutting and stripping unit.

11. The apparatus of claim 10, wherein said insulation removing means comprises:

two pair of cooperating heated dies, each pair of dies being constructed and arranged to heat and burn the insulation through an arc of 360° to provide said bare wire areas.

12. The apparatus of claim 11, wherein the spacing between said heated dies is substantially equal to the spacing between said two pair of stripping blades.

13. The apparatus of claim 10, wherein each pair of stripping blades is positioned to register with a bare wire area and said stripping blades are spaced from the shoulders bordering said area.

14. The apparatus of claim 10, and including a rotatable measuring wheel disposed to ride against the wire as said wire is being fed by said feeding means, and an encoder operably connected to said measuring wheel for generating a feedback signal in accordance with the length of wire measured by said measuring wheel, said feedback signal being fed to said controller along with said signal from the input device and said laser sensing unit.

15. A method of cutting and stripping insulated wire, comprising the steps of feeding an insulated wire axially in predetermined increments of length in a downstream path of travel, removing a short length of insulation from said wire when said wire is stopped to provide an exposed wire area bordered by a pair of insulation shoulders, feeding the wire downstream through a cutting and stripping unit including a pair of central cutting blades and two pair of stripping blades, each located on opposite sides of said cutting blades, sensing the position of one of said shoulders of insulation as said wire is fed downstream, and adjusting the wire axially in accordance with said position to precisely locate said exposed wire area relative to said cutting and stripping unit.

16. The method of claim 15, wherein the step of sensing the position of said shoulder comprises directing a thin laser beam in intersecting relation with said path of travel from a laser transmitter on one side of said path to a receiver on the opposite side of the path, and generating an electrical signal in a response to a change in the amount of light being transmitted to said receiver as said shoulder intersects said beam.

17. The method of claim 15, wherein the step of removing a short length of insulation comprises the steps of engaging the insulation with a pair of cooperating heated dies to burn said insulation and provide said area of exposed bare wire.

18. A method of cutting and stripping insulated wire, comprising the steps of feeding an insulated wire in predetermined increments of length in a downstream path of travel, contacting the insulation at spaced locations with heated dies to burn the insulation and provide a pair of spaced areas of exposed bare wire, directing a thin vertical curtain of a laser beam in intersecting relation with said path of travel from a transmitter on one side of said path to a receiver on the opposite side of said path, generating an electrical signal in response to a change in the amount of light being transmitted to said receiver as a shoulder bordering one of said bare wire areas intersects said beam, adjusting the wire axially in accordance with said signal to precisely locate a pair of cooperating cutting blades intermediate said two exposed bare wire areas and to locate pairs of stripping blades in registry with said bare wire areas, moving the cutting blades in a direction toward each other to sever said wire and provide a cut length of wire, and moving the wire and said cut length in opposite directions to strip slugs of insulation from the end of the wire and from the end of the cut length.

19. The method of claim 18 and including the step of spacing each pair of stripping blades from the shoulders bordering the corresponding exposed wire area.

* * * * *